April 15, 1952     I. GRUMBLES     2,593,299
PORTABLE IRRIGATING APPARATUS
Filed Jan. 12, 1950     2 SHEETS—SHEET 1

Irvin Grumbles
INVENTOR.

April 15, 1952     I. GRUMBLES     2,593,299
PORTABLE IRRIGATING APPARATUS
Filed Jan. 12, 1950     2 SHEETS—SHEET 2
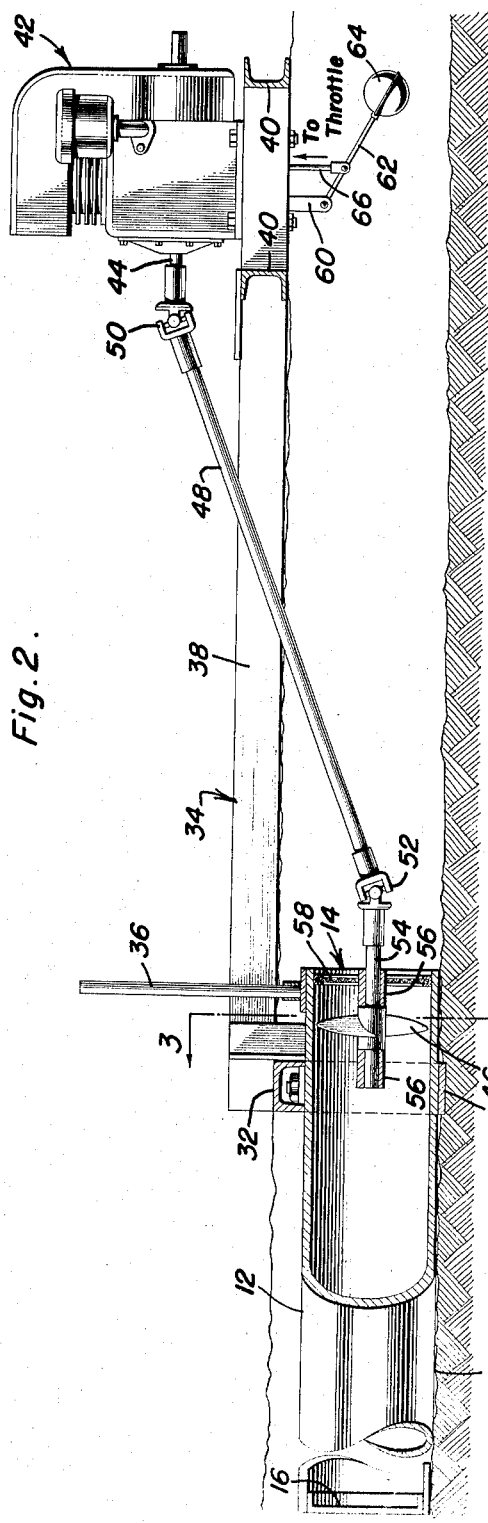
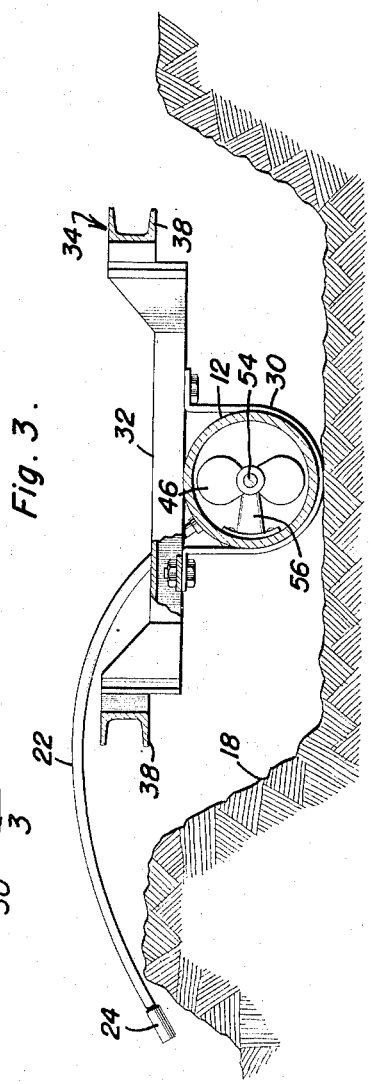
Irvin Grumbles
    INVENTOR.

UNITED STATES PATENT OFFICE 2,593,299

PORTABLE IRRIGATING APPARATUS

Irvin Grumbles, San Saba, Tex.

Application January 12, 1950, Serial No. 138,099

3 Claims. (Cl. 61—12)

This invention relates to new and useful improvements and structural refinements in portable irrigating apparatus, and the principal object of the invention is to facilitate distribution of water from an irrigating ditch to rows of crop at both sides of the ditch without the necessity of digging lateral ditch extensions or branches.

This object is achieved by the provision of the instant apparatus which includes in its construction a conduit adapted to be placed in an irrigating ditch and provided with a plurality of laterally extending irrigating tubes, together with motor-driven means in the conduit for delivering water under pressure from the ditch into the conduit and to the lateral irrigating tubes communicating therewith.

Some of the advantages of the invention reside in its simplicity of construction, in its portability, and in its adaptability to economical manufacture.

With the above more important objects and features in view and such other objects and features as may become apparent as this specification proceeds, the invention consists essentially in the arrangement and construction of parts as illustrated in the accompanying drawings, in which:

Figure 2 is a fragmentary sectional view, taken substantially in the plane of the line 2—2 in Figure 1; and Figure 3 is a fragmentary sectional view, taken substantially in the plane of the line 3—3 in Figure 2.

Like characters of reference are employed to designate like parts in the specification and throughout the several views.

Figure 1:
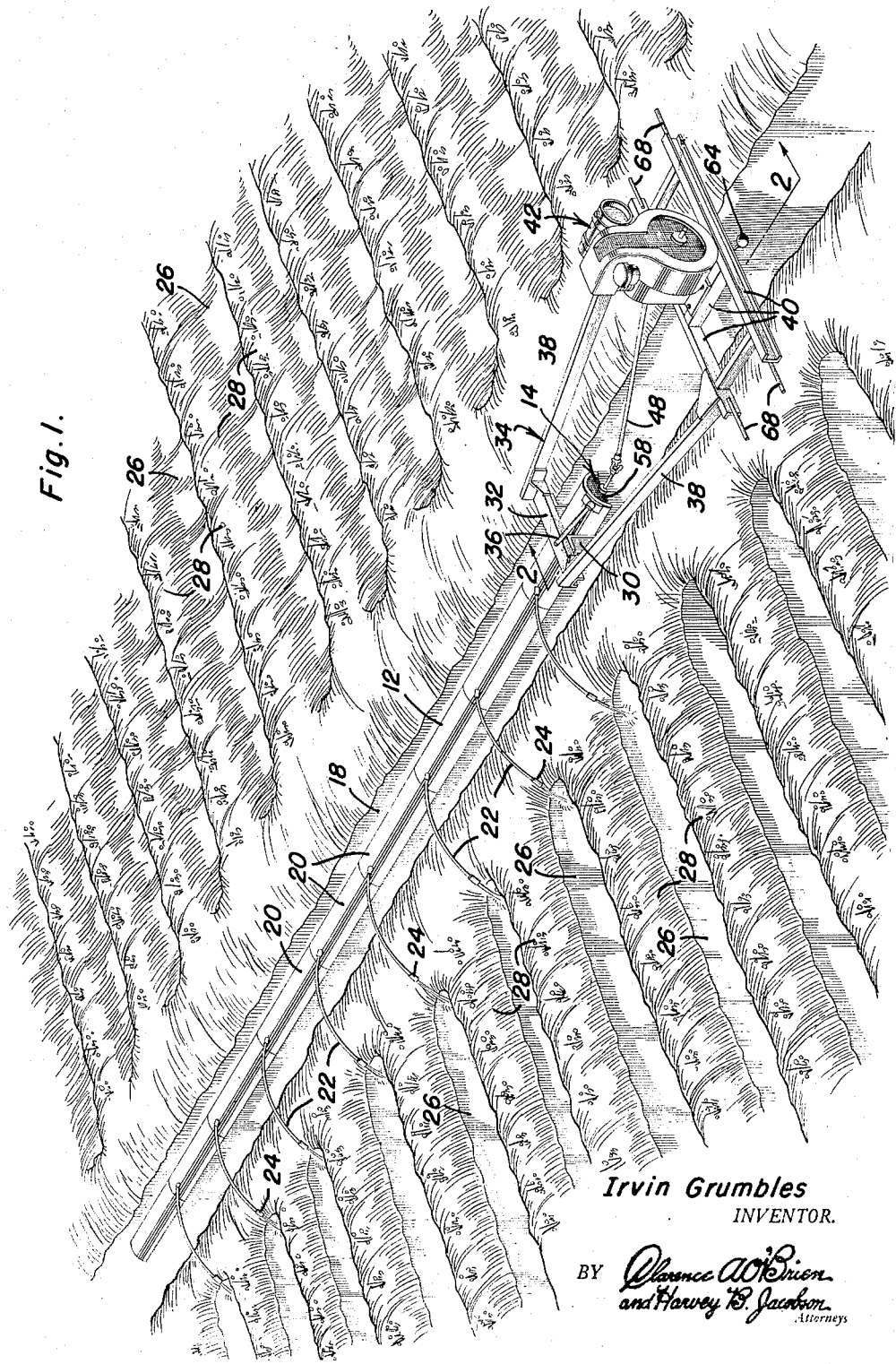
Figure 1 is a perspective view of the invention in use.

Referring now to the accompanying drawings in detail, the invention consists of a portable irrigating apparatus designated generally by the reference character 10, the same embodying in its construction a conduit 12 having an open end 14 and a closed end 16 and adapted to be positioned in an irrigation ditch 18, as is best shown in Figure 1.

The conduit 12 is preferably constructed from several sections 20 which are separably connected together in any conventional manner so that the length of the conduit may be increased or decreased, as desired.

In any event, a plurality of laterally extending, flexible irrigating tubes 22 are connected at longitudinally spaced points to the conduit 12 and are provided at their free ends with outlet nozzles 24, each discharging into a groove 26 between two adjacent rows of crop 28, as will be clearly apparent.

The open end portion of the conduit 12 is rotatably supported in a U-shaped bracket 30 depending from a cross-member 32 of a frame 34, and it is to be noted that a lever 36 is provided at the open end of the conduit 12 so that the latter may be rotated or turned from side to side and the irrigating tubes 24 correspondingly swung from the rows of crop at one side of the ditch to the other.

The aforementioned frame 34 also includes a pair of divergent, longitudinal members 38 which, in turn, are secured to an elongated base 40 carrying a motor, such as for example, a small gasoline motor 42, the crank shaft 44 of which is operatively connected by articulated shaft means to a rotor 46 provided in the open end portion of the conduit 12, as will be presently described. These articulated shaft means simply consist of a shaft 48 which is connected by a universal joint 50 to the crank shaft 44 and is also connected by a second universal joint 52 to a driven shaft 54 on which the rotor 46 is mounted, the shaft 54 being rotatably journaled in a pair of bearing brackets 56 provided in the open end portion of the conduit 12.

By virtue of this arrangement, rotation of the motor crank shaft 44 will be transmitted to the rotor 46 which, in turn, will propel water in the ditch 18 into the conduit 12 and through the irrigating tubes 22 to the rows of crop 28, and if desired a suitable screen 58 may be provided in the open end of the conduit 12, outwardly of the rotor 46, so as to prevent foreign material from gaining entry into the conduit and to the rotor.

It is to be noted that a bracket 60 is provided at the under side of the motor base 40 and has pivotally connected thereto an arm 62 carrying a float 64, the latter being intended to float upon the surface of water in the ditch 18 and rise or fall with the level thereof. The arm 62 is operatively connected to a throttle link 66 regulating the speed of the engine 42, in which manner the speed of the engine is automatically increased as the water in the ditch 18 rises, and vice versa. Needless to say, the irrigating scope of the invention is limited by the length of the conduit 12, and when this limit has been reached the entire apparatus may be moved longitudinally of the ditch 18. To facilitate this, the motor base 40 may be equipped with a plurality of laterally projecting handles 68.

It is believed that the advantages and use of the invention will be clearly apparent from the foregoing disclosure, and accordingly further description thereof at this point is deemed unnecessary.

Having described the invention, what is claimed as new is:

1. In a portable irrigating apparatus, the combination of a conduit adapted to be positioned in a ditch and having a closed end and an open end, a plurality of laterally extending irrigating tubes connected at longitudinally spaced points to said conduit, a rotor mounted in the open end portion of the conduit for delivering water under pressure into the latter, an elongated base adapted for positioning transversely of the stated ditch adjacent the open end of the conduit, means rotatably connecting the conduit to said base, means for rotating said conduit, a motor mounted on said base, and an articulated drive shaft operatively connecting said motor to said rotor.

2. A portable irrigating apparatus comprising a conduit adapted to be positioned in a ditch and having a closed end and an open end, a plurality of laterally extending irrigating tubes connected at spaced points to said conduit, a rotor mounted in the open end portion of the conduit for delivering water under pressure into the latter, an elongated base adapted for positioning transversely of the stated ditch adjacent the open end of the conduit, a motor mounted on said base, means operatively connecting the rotor to the motor for actuation thereby, said motor including a speed control link, and a movable float mounted beneath the base and operatively connected to said link for varying the speed of the motor in response to variations in the level of the water in the ditch.

3. An irrigating apparatus comprising a base structure for bridging an irrigation ditch, a pair of spaced members extending from the base structure, a cross-member extending between said spaced members, a conduit disposable longitudinally in the ditch and having one end portion rotatably secured beneath the cross member for rotary adjustment, said one end of the conduit being open, a closure at the other end of the conduit, a plurality of flexible discharge pipes connected to the conduit at longitudinally spaced points, an impeller rotatably mounted in the open end portion of the conduit, a power plant mounted on the base structure, means operatively connecting said power plant to the impeller for driving water from the ditch into the conduit, and manually operable means for rotating the conduit for directing the discharge pipes toward either side of the ditch.

IRVIN GRUMBLES.

REFERENCES CITED

The following references are of record in the file of this patent:

UNITED STATES PATENTS

| Number | Name | Date |
|---|---|---|
| 617,927 | Dorrestein | Jan. 17, 1899 |
| 961,292 | Fowler | June 14, 1910 |
| 1,077,132 | Erickson | Oct. 28, 1913 |
| 1,603,110 | Horten | Oct. 12, 1926 |